US010158423B2

(12) United States Patent
Zinevich

(10) Patent No.: US 10,158,423 B2
(45) Date of Patent: Dec. 18, 2018

(54) COMMUNICATING NETWORK MAINTENANCE DATA IN A CABLE SYSTEM

(71) Applicant: ARCOM DIGITAL, LLC, Syracuse, NY (US)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 0 days.

(21) Appl. No.: 15/795,362

(22) Filed: Oct. 27, 2017

(65) Prior Publication Data

US 2018/0219621 A1    Aug. 2, 2018

Related U.S. Application Data

(60) Provisional application No. 62/452,426, filed on Jan. 31, 2017.

(51) Int. Cl.
*H04B 10/25* (2013.01)
*H04B 10/079* (2013.01)

(52) U.S. Cl.
CPC ... *H04B 10/07951* (2013.01); *H04B 10/2503* (2013.01); *H04B 10/2504* (2013.01)

(58) Field of Classification Search
CPC .......... H04B 10/07951; H04B 10/2503; H04B 10/2504
USPC ....................................................... 398/25
See application file for complete search history.

(56) References Cited

U.S. PATENT DOCUMENTS 6,895,043 B1    5/2005    Naegeli et al.
7,024,680 B2    4/2006    Howard
7,415,367 B2    8/2008    Williams
7,584,496 B2    9/2009    Zinevich
7,978,735 B2    7/2011    Ezra et al.
(Continued)

FOREIGN PATENT DOCUMENTS

EP        0487306 A2    5/1992

OTHER PUBLICATIONS

CABLELABS®, Data-Over-Cable Service Interface Specifications, DOCSIS® 3.1 Physical Layer Specification, CM-SP-PHYv3.1-I10-170111, Jan. 11, 2017, pp. 1-248 and Section 9.3, Cable Television Laboratories, Inc., Louisville, CO.
(Continued)

*Primary Examiner* — Dalzid Singh
(74) *Attorney, Agent, or Firm* — Lawrence P. Trapani, Esq.

(57) ABSTRACT

A test equipment module and method of communicating maintenance data in a cable system is disclosed. The module comprises a receiver, a measurement system, a pilot generator, and a signal encoder. The receiver receives downstream signals from a host communication network. The measurement system determines a maintenance parameter value associated with the downstream signals. The pilot generator generates a pilot within the downstream frequency band, and a signal encoder encodes the pilot with the maintenance parameter value. The pilot generator adds the encoded pilot to the downstream signals in the communication network, such that a cable modem in the network can receive the encoded pilot and generate a spectrum that includes the encoded pilot. A PNM server receives the spectrum from the cable modem and determines the maintenance parameter value from the spectrum.

38 Claims, 7 Drawing Sheets

(56) References Cited

U.S. PATENT DOCUMENTS

| | | | |
|---|---|---|---|
| 8,458,759 B2 | 6/2013 | Zinevich | |
| 8,649,421 B2 | 2/2014 | Renken et al. | |
| 8,749,248 B2 | 6/2014 | Murphy et al. | |
| 8,856,850 B2 | 10/2014 | Sala et al. | |
| 8,861,620 B2* | 10/2014 | Toosi | H04L 25/03 375/257 |
| 9,160,407 B2 | 10/2015 | Stelle, IV et al. | |
| 9,203,658 B2 | 12/2015 | Toosi et al. | |
| 9,264,101 B2 | 2/2016 | Currivan et al. | |
| 9,531,562 B2 | 12/2016 | Currivan et al. | |
| 9,826,263 B2 | 11/2017 | Zinevich | |
| 2008/0089362 A1 | 4/2008 | Ezra et al. | |
| 2013/0004179 A1* | 1/2013 | Nielsen | H04B 3/50 398/115 |
| 2013/0125183 A1 | 5/2013 | Gomez et al. | |
| 2014/0133330 A1 | 5/2014 | Chapman | |
| 2014/0254697 A1* | 9/2014 | Zhang | H04L 5/0051 375/260 |
| 2015/0052572 A1* | 2/2015 | Schemmann | H04L 12/2801 725/116 |
| 2015/0295684 A1* | 10/2015 | Jin | H04L 5/0007 370/390 |
| 2016/0028496 A1 | 1/2016 | Currivan et al. | |
| 2016/0119662 A1 | 4/2016 | Zinevich | |
| 2017/0195756 A1* | 7/2017 | Schemmann | H04Q 11/0005 |
| 2017/0353750 A1 | 12/2017 | Gotwals et al. | |

OTHER PUBLICATIONS

CABLELABS®, Data-Over-Cable Service Interface Specifications, DOCSIS® 3.1, CCAP™ Operations Support System Interface Specification, CM-SP-CCAP-OSSIv3.1-I07-160602, Jun. 2, 2016, pp. 1-699, Cable Television Laboratories, Inc., Louisville, CO.

CABLELABS®, Data-Over-Cable Service Interface Specifications, DCA—MHAv2 Remote PHY Specification, CM-SP-R-PHY-I05-160923, Sep. 23, 2016, pp. 1-183, and Appendix I at Section 1.2 (p. 180), Cable Television Laboratories, Inc., Louisville, CO.

CABLELABS®, Data-Over-Cable Service Interface Specifications, DCA—MHAv2, Remote Out-of-Band Specification, CM-SP-R-OOB-I06-170524, May 24, 2017, pp. 1-64; Sections 5, 7, 7.2, Appendix I, and Appendix II, Cable Television Laboratories, Inc., Louisville, CO.

CABLELABS®, Data-Over-Cable Service Interface Specifications, DOCSIS Set-top Gateway (DSG) Interface Specification, CM-SP-DSG-I24-130808, Aug. 8, 2013, pp. 1-190, Sections 4 & 5.

CABLELABS®, DOCSIS® Best Practices and Guidelines, PNM Best Practices: HFC Networks (DOCSIS 3.0), CM-GL-PNMP-V03-160725, Jul. 25, 2016, pp. 1-180, pp. 111-114, & Section 7.2.8.1, Cable Television Laboratories, Inc., Louisville, CO.

Jim Walsh and Samir Parikh, How Complex Changes Coming to Cable can Make Technicians' Lives Simpler, a Technical Paper Prepared for the Society of Cable Telecommunications Engineers (SCTE), Oct. 13, 2015, pp. 1-22 (Figs. 1-12) SCTE Cable-Tec EXPO'15, New Orleans, LA.

John T. Chapman, Remote PHY for Converged DOCSIS, Video, and OOB, White Paper, Sep. 2014, pp. 1-19, Cisco Systems, Inc., San Jose, CA.

John T. Chapman, DOCSIS Remote PHY, Modular Headend Architecture (MHAv2), a Technical Paper Prepared for the Society of Cable Telecommunications Engineers (SCTE), Oct. 21, 2013, pp. 1-21, SCTE Cable-Tec EXPO'13, Atlanta, GA.

Hitron Technologies Inc., CMS-02 Embedded Spectrum Analysis Module DOCSIS 3.0 Datasheet, May 2016, pp. 1-2, Hitron Technologies Inc., Centennial, CO.

* cited by examiner

TABLE I

| CPD Signal Power Level (dBmV) | Pilot Signal Center Freq. (MHz) |
|---|---|
| < −70 | 89.00 |
| −70 | 89.05 |
| −60 | 89.07 |
| −50 | 89.09 |
| −40 | 89.11 |
| −30 | 89.13 |
| −20 | 89.15 |
| −10 | 89.17 |
| 0 | 89.19 |

TABLE II

| ROUND-TRIP TIME DELAY (μSEC) | Pilot Signal Center Freq. (MHz) |
|---|---|
| 25.00 | 88.8000 |
| 24.90 | 88.8006 |
| 24.80 | 88.8012 |
| 24.70 | 88.8018 |
| ⋮ | ⋮ |
| 2.30 | 88.9350 |
| ⋮ | ⋮ |
| 0.00 | 88.9506 |

FIG. 4

COMMUNICATING NETWORK MAINTENANCE DATA IN A CABLE SYSTEM

CROSS-REFERENCE TO RELATED APPLICATIONS

This application claims the benefit of U.S. Provisional Application No. 62/452,426, filed Jan. 31, 2017, incorporated herein by reference.

BACKGROUND OF THE INVENTION

Field of Invention

The present invention relates generally to maintenance equipment in a hybrid-fiber coax (HFC) cable network, and more particularly to compact, low-cost, low power-consuming test equipment modules and associated methods for use in a modern HFC cable network.

Background Art

Modern HFC networks are now employing a Converged Cable Access Platform (CCAP) architecture, which merges video and data services into one location or physical chassis (converged video and data). The data services are realized by DOCSIS 3.0/3.1 compliant CMTSs and the video services are realized by Edge QAMs or universal QAMs. Both CMTSs and Edge QAMs (or universal QAMs) are integrated into one device called a CCAP or CCAP chassis. DOCSIS stands for Data-Over-Cable Service Interface Specification (DOCSIS), a specification published by Cable Television Laboratories, Inc. (CableLabs®) of Louisville, Colo. The DOCSIS 3.1 specification succeeds the DOCSIS 3.0 specification. CMTS stands for Cable Modem Termination System. Each CMTS communicates with a number of cable modems (CMs) distributed in the cable plant (or within a node of the cable plant). Generally, the CMTS is located at a headend or hub of the plant, while the CMs are located at the subscriber end of the plant. In a CCAP architecture, as mentioned, the CMTS is integrated in the CCAP chassis, which is located at a headend or hub of the plant. The Edge QAMs (or universal QAMs) typically conduct video processing functions and prepare the video for analog transmission over fiber optic and RF coaxial cables, using quadrature amplitude modulation (QAM). CableLabs® has prepared a specification for CCAP, entitled Data-Over-Cable Service Interface Specifications DOCSIS® 3.1, CCAP™ Operations Support System Interface Specification, CM-SP-CCAP-OSSIv3.1407-160602 (Jun. 2, 2016), which is incorporated herein by reference (hereafter "CCAP Specification").

The implementation of CCAP has evolved toward a distributed architecture known as Remote PHY architecture. PHY stands for physical layer and refers to the physical layer elements of the cable plant. In a CCAP Remote PHY architecture, the media or video conversion (e.g., MPEG video to QAM) function is removed from the CCAP chassis and placed further downstream, preferably at a fiber node ("Remote PHY device"). By placing PHY elements further downstream, (1) subscribers can be more selectively targeted for programming and advertising, and (2) Ethernet or PON (passive optical network) communication can replace analog transmission between the CCAP chassis (now called the "CCAP-core") and the Remote PHY device (e.g., Remote PHY fiber node). The latter consequence has the advantage of reducing the cost of transmission equipment at the headend and improving modulation error ratio (MER). Typically, the CCAP-core contains both a CMTS core for DOCSIS data communication and an Edge QAM core for video. The CMTS core contains a DOCSIS Media Access Control unit (MAC) and upper layer DOCSIS protocols, including signaling functions, downstream and upstream bandwidth scheduling, and DOCSIS framing. The Edge QAM core contains all video processing functions that a conventional Edge QAM provides. The Remote PHY device can be defined as a physical layer converter, which: (1) converts downstream DOCSIS, MPEG video and out-of-band (OOB) signals, received from the CCAP-core (via Ethernet or PON), to analog for transmission over fiber optic and RF cable; and (2) converts upstream DOCSIS and OOB analog signals, received from subscribers (on fiber optic or RF cable), to digital signals for transmission (via Ethernet or PON) to the CCAP-core. The Remote PHY device (e.g., fiber node) contains circuitry, such as downstream QAM modulators, upstream QAM demodulators, and logic to connect to the CCAP-core. CableLabs® has prepared a specification for Remote PHY Architecture, entitled Data-Over-Cable Service Interface Specifications, DCA-MHAv2 Remote PHY Specification, CM-SP-R-PHY-I05-160923 (Sep. 23, 2016), which is incorporated herein by reference (hereafter "Remote PHY Specification").

Another aspect of a modern HFC network is a maintenance strategy that utilizes deployed intelligent communication devices, such as DOCSIS-enabled CMTSs, CMs and set-top boxes (STBs), to help cable operators measure signal-performance metrics, monitor impairments in the network, and fix problems before they have an impact on service. This strategy is called Proactive Network Maintenance or PNM. One well-known PNM technique is upstream pre-equalization (pre-distorts upstream signals with a transfer function inverse to that of a distorted communication channel between the CM and CMTS). Upstream pre-equalization is performed by DOCSIS 3.0 and 3.1 cable modems. DOCSIS 3.0 and 3.1 modems are also capable of capturing the full downstream spectrum (called "full-spectrum capture" or "full-band capture"), which gives the operator an ability to see the downstream spectrum at multiple points (e.g., subscribers' homes) in the coaxial cable plant, as if viewing a spectrum analyzer display at each subscriber's home. PNM functions are directed by a PNM server located at a headend, network operations center, or other suitable location. The PNM server communicates with (e.g., "polls") the CMs via the DOCSIS communication network in the cable system, using simple network management protocol (SNMP) and by addressing the IP addresses of the CMs. The PNM server executes maintenance tools and routines at the request and schedule of operator personnel, which communicate with the PNM server using a "PNM client" or Web browser and via a wide area network (WAN), such as the Internet, or via the operator's virtual private network (VPN), or via both networks. Upon specific request or by automated operation of a PNM maintenance tool or routine, the PNM server polls the CMs for full-spectrum capture data, which is delivered upstream to the PNM server via the DOCSIS communication network (e.g., CM to coax, to optical node and/or Remote PHY device or node, to fiber, to CCAP/CMTS core, to hub, to headend and/or PNM server). CableLabs® has prepared a document entitled, PNM Best Practices: HFC Networks (DOCSIS 3.0), CM-GL-PNMP-VO3-160725 (Jul. 25, 2016), which is incorporated herein by reference (see, e.g., Section 7.2.8.1 of this document). PNM systems and spectrum capture modems are disclosed in the following patent documents:

U.S. Pat. No. 9,531,562 (Dec. 27, 2016) (FIG. 11); U.S. Pat. No. 9,264,101 (Feb. 16, 2016); U.S. Pat. No. 9,203,658 (Dec. 1, 2015); U.S. Pat. No. 8,861,620 (Oct. 14, 2014); U.S. Pat. No. 7,978,735 (Jul. 12, 2011) (FIGS. 2 & 3); U.S. Pat. App. Pub. 2013/0125183 (May 16, 2013); and U.S. Pat. App. Pub. 2008/0089362 (Apr. 17, 2008).

Maintenance functions (e.g., network impairment detection and location) may also be carried on outside of traditional PNM devices. For example, U.S. Patent Application Publication 2016/0119662 (Apr. 28, 2016) to Zinevich (the inventor herein) discloses a method of detecting and locating sources of common path distortion (CPD) in a modern HFC network with CCAP architecture, based on synchronous capture (downstream and upstream) of DOCSIS OFDM signals at a CMTS or CM. U.S. Patent Application Publication 2016/0119662 ("US20160119662") is incorporated herein by reference. The CPD detection/location method of US20160119662 can be implemented at a CMTS, e.g., in a field-programmable gate array (FPGA) chip. However, some CMTSs have limitations on the number, size or use of FPGAs, and some CMTS vendors prefer to use proprietary chipsets instead of FPGAs. Thus, challenges are presented with the implementation of the CPD detection/location method of US20160119662.

Another example of network maintenance functions implemented outside of traditional PNM tools is the use of test equipment modules deployed within host network devices, such as bi-directional amplifiers, legacy fiber nodes, Remote PHY (R-PHY) architecture nodes, or other R-PHY devices. Such modules are permitted and anticipated in the Remote PHY Specification CM-SP-R-PHY-I05-160923 (cited above), discussed in Appendix I of the Specification, at Section 1.2, Hardware Module in the Node (p. 180). There, it is stated that: "Test equipment vendors may develop modules that will be deployed within a node that supports the R-PHY architecture that performs the same function as the equipment that was previously deployed in the headend. Since the module is located in the R-PHY Node, the same telemetry and control channels can be used." A commercially available module of this type (intended for amplifier enclosures) is a Hitron CMS-02 Embedded Spectrum Analysis Module, supplied by Hitron Technologies Americas Inc., Centennial, Colo. (www.hitron-americas.com/product/cms-02). This and other similar modules intended for amplifiers or fiber nodes utilize a DOCSIS-compliant CM for communicating (or "backhauling") measurement data to the PNM server. Operation of such a CM consumes a sizable amount of power in the host network device (e.g., R-PHY node). For example, the power consumption of a DOCSIS 3.0 cable modem is about 7 watts. Also, such DOCSIS modems are costly; for example, even a DOCSIS 2.0 modem can cost a module manufacturer more than $100. Further, the use of a DOCSIS modem requires a connection to a test port located outside of the diplex filter of the host network device; however, in most modern network devices, such a test port is unavailable. Finally, a test equipment module that includes a cable modem has a relatively large size and thus occupies a relatively large space within an enclosure of the host network device. At the very least, the aforesaid power consumption, cost, test point connection, and size challenges are likely to limit the number of modules (and test capability) at a host network device. Thus, the deployment of test equipment modules intended to communicate with a PNM server, such as anticipated by the Remote PHY Specification, poses significant challenges. Thus, such modules currently appear to have limited application.

Accordingly, a need exists in the HFC network plant industry for a remote test equipment module (to be installed in a host network device) that communicates network maintenance data to an network operator (e.g., communicate with PNM server), without imposing significant additional power, cost, space, installation or integration requirements on a host network device.

OBJECTS AND SUMMARY OF THE INVENTION

It is therefore an object of the present invention to overcome the problems and limitations associated with the prior art and to fulfill the aforementioned need.

It is another object of the present invention to provide a test equipment module and method that works with and supplements the capabilities of a PNM system in a cable plant.

It is a further object of the present invention to provide a test equipment module or method able to communicate maintenance data to a network operator (e.g., PNM server) without imposing significant power, cost, space, installation or integration requirements on a host device.

It is still another object of the present invention to provide a test equipment module or method that can be easily installed or implemented in a host network device, such as a legacy fiber node, a modern Remote PHY node, other R-PHY device, or other network device.

It is still a further object of the present invention to provide a test equipment module or method, to be installed or implemented in a host network device, that has relatively low power consumption.

It is yet another object of the present invention to provide a test equipment module or method, to be installed or implemented in a host network device, that is of relatively low cost.

It is yet a further object of the present invention to provide a test equipment module or method, to be installed or implemented in a host network device, that is of relatively small size.

It is still yet a further object of the present invention to provide a test equipment module or method, to be installed or implemented in a host network device, that can communicate maintenance data to a network operator or PNM server without the use of a cable modem.

These and other objects are attained in accordance with the present invention, wherein there is provided, in one embodiment, a test equipment module for use in a cable system. The cable system is of the type that includes a communication network (e.g., a DOCSIS network) and a network maintenance manager (e.g., a PNM server). The communication network carries downstream signals in a downstream frequency band and includes, at a minimum, a coaxial cable plant, a cable modem, and a host network device. The cable modem is coupled to the coaxial cable plant and is equipped to receive signals in the downstream frequency band and generate a spectrum representation of the signals. The host network device is coupled to the coaxial cable plant and is in signal communication with the cable modem. The host network device contains a first test port that provides access to the downstream signals of the communication network. The network maintenance manager is in communication with the cable modem through the communication network. The network maintenance manager is configured to receive the spectrum representation of the signals from the cable modem.

In the one embodiment, the test equipment module comprises a first receiver, a measurement system, a pilot generator for generating a pilot signal, and a signal encoder for encoding the pilot signal. The first receiver is coupleable to the first test port of the host network device for receiving the downstream signals of the communication network. The measurement system is coupled to the first receiver and determines a value of a first maintenance parameter associated with at least one of the downstream signals. The pilot generator is coupled to the measurement system and generates a first pilot signal substantially within the downstream frequency band. The signal encoder is associated with the measurement system and pilot generator. The signal encoder encodes the first pilot signal with the value of the first maintenance parameter to provide a first encoded pilot. The value of the first maintenance parameter is determinable from a spectrum representation that includes the first encoded pilot. The pilot generator is coupleable to the first test port of the host network device for adding the first encoded pilot to the downstream signals in the communication network. The cable modem then receives the first encoded pilot and captures a spectrum representation that includes the first encoded pilot. The network maintenance manager then receives the spectrum representation that includes the first encoded pilot. The network maintenance manager is then able to determine the value of the first maintenance parameter from the spectrum representation that includes the first encoded pilot. For the purpose of this specification, including the claims, the term "coupleable" means capable of being coupled to something else.

In a more specific embodiment of the module of the present invention, the signal encoder operates based on a coding relationship between a plurality of coding frequencies for the first pilot signal and a plurality of values for the first maintenance parameter, respectively. Thus, the signal encoder encodes the first pilot signal with the value of the first maintenance parameter by tuning the first pilot signal to one of the coding frequencies. The first pilot signal is tuned to a coding frequency that substantially corresponds to the value of the first maintenance parameter determined by the measurement system ("frequency coding"). Thus, the value of the first maintenance parameter is determinable from the frequency of the first pilot signal. In a variation of this embodiment, the coding relationship includes a relationship between a default frequency for the first pilot signal and a decision (made by the measurement system) that a value for the first maintenance parameter is indeterminable. In this case, the signal encoder tunes the first pilot signal to the default frequency and, ultimately, the network maintenance manager will determine that a value for the first maintenance parameter is unavailable or does not exist.

An advantage of the above-described frequency coding of a pilot signal is that the maintenance parameter value (e.g., CPD signal level or round-trip time delay) encoded on the pilot signal is not a function of amplitude of the encoded pilot (as received by the cable modem). Thus, variations in amplitude of the encoded pilot (e.g., due to different insertion loses at different points in the coaxial plant) will not adversely affect the accuracy of reading the correct parameter value.

In another embodiment of the present invention, the test equipment module further comprises a second receiver coupled to the measurement system. The communication network carries upstream signals in an upstream frequency band, and the host network device contains a second test port that provides access to the upstream signals. The upstream signals include actual distortion signals created from the downstream signals by a non-linear impairment in the coaxial cable plant. The non-linear impairment may be a source of common path distortion (CPD), such as a corroded connector or contact of a cable or network device. The second receiver is coupleable to the second test port of the host network device for receiving from the communication network the actual distortion signals. The first receiver includes a distortion emulator for emulating the actual distortion signals, to provide emulated distortion signals. The measurement system receives the emulated distortion signals from the first receiver and the actual distortion signals from the second receiver. The first maintenance parameter is a level (e.g., power level) of the actual distortion signals. The measurement system is configured to determine a value of the level of the actual distortion signals by performing a cross-correlation between the emulated distortion signals and the actual distortion signals.

In a further embodiment of the present invention, two or more maintenance parameters are determined by the test equipment module and communicated to the network maintenance manager in a similar fashion to what has already been described. In this further embodiment, the measurement system is configured to determine a value of a second maintenance parameter associated with at least one of the downstream signals. The pilot generator is configured to generate a second pilot signal substantially within the downstream frequency band. The signal encoder is configured to encode the second pilot signal with the value of the second maintenance parameter to provide a second encoded pilot. The value of the second maintenance parameter is determinable from a spectrum representation that includes the second encoded pilot. The pilot generator adds the second encoded pilot to the downstream signals in the communication network when coupled to the first test port of the host network device. The cable modem then receives the second encoded pilot and captures a spectrum representation that includes the second encoded pilot. The network maintenance manager then receives the spectrum representation that includes the second encoded pilot. The network maintenance manager is then able to determine the value of the second maintenance parameter from the spectrum representation that includes the second encoded pilot.

In the embodiment specifically dealing with the detection of actual distortions signals caused by a non-linear impairment, the second maintenance parameter might be the round-trip time delay between the host network device and the non-linear impairment. This parameter can be determined by the time difference between the actual and the emulated distortion signals. The measurement system determines this time-based parameter from the cross-correlation between the emulated distortion signals and the actual distortion signals.

A method of communicating network maintenance data in a cable system is also within the scope of the present invention. As described, the cable system includes a communication network and a network maintenance manager. The communication network carries downstream signals in a downstream frequency band and includes a coaxial cable plant and a cable modem coupled to the coaxial cable plant. The cable modem is equipped to receive signals in the downstream frequency band and capture a spectrum representation of the signals. The network maintenance manager is in communication with the cable modem through the communication network. The manager receives the spectrum representation of the signals from the cable modem. In one embodiment, the method of the present invention comprises the steps of: (a) receiving the downstream signals from the communication network; (b) determining a value of a first maintenance parameter associated with at least one of the downstream signals; (c) generating a first pilot signal substantially within the downstream frequency band; (d) encoding the first pilot signal with the value of the first maintenance parameter to provide a first encoded pilot, such that the value of the first maintenance parameter is determinable from a spectrum representation that includes the first encoded pilot; (e) adding the first encoded pilot to the downstream signals in the communication network; (f) at the cable modem, receiving the first encoded pilot and capturing a spectrum representation that includes the first encoded pilot; (g) at the network maintenance manager, receiving the spectrum representation that includes the first encoded pilot; and (h) determining the value of the first maintenance parameter from the spectrum representation that includes the first encoded pilot.

In an embodiment dealing with the detection of actual distortion signals caused by a non-linear impairment (e.g., a CPD source) in the coaxial cable plant, the method may further comprise the step of: (i) receiving the actual distortion signals from the communication network. In this embodiment, the first maintenance parameter is the level of the actual distortion signals. Also, in this embodiment, the actual distortion signals are emulated from the downstream signals to provide emulated distortion signals. Further, in this embodiment, a value of the level of the actual distortion signals is determined from a cross-correlation between the emulated distortion signals and the actual distortion signals.

As in the case with the test equipment module, the method of the present invention may further process two maintenance parameters. In such case, the method further comprises the steps of: (i) determining a value of a second maintenance parameter associated with at least one of the downstream signals; (j) generating a second pilot signal substantially within the downstream frequency band; (k) encoding the second pilot signal with the value of the second maintenance parameter to provide a second encoded pilot, such that the value of the second maintenance parameter is determinable from a spectrum representation that includes the second encoded pilot; (l) adding the second encoded pilot to the downstream signals in the communication network; (m) at the cable modem, receiving the second encoded pilot and capturing a spectrum representation that includes the second encoded pilot; (n) at the network maintenance manager, receiving the spectrum representation that includes the second encoded pilot; and (o) determining the value of the second maintenance parameter from the spectrum representation that includes the second encoded pilot. The first and second encoded pilot may be added to the downstream signals simultaneously or at different times.

In a further embodiment of the present invention, the maintenance parameter to be measured concerns the upstream signals carried in the coaxial cable plant of the communication network. In this embodiment, a method comprises the steps of: (a) receiving the upstream signals carried by the coaxial cable plant of the communication network; (b) determining a value of a maintenance parameter associated with at least one of the upstream signals; (c) generating a pilot signal substantially within the downstream frequency band; (d) encoding the pilot signal with the value of the maintenance parameter to provide an encoded pilot, such that the value of the maintenance parameter is determinable from a spectrum representation that includes the encoded pilot; (e) adding the encoded pilot to the downstream signals in the communication network; (f) at a cable modem, receiving the encoded pilot and capturing a spectrum representation that includes the encoded pilot; (g) at a network maintenance manager, receiving the spectrum representation that includes the encoded pilot; and (h) determining the value of the maintenance parameter from the spectrum representation that includes the encoded pilot.

BRIEF DESCRIPTION OF THE DRAWING

Further objects of the present invention will become apparent from the following description of preferred embodiment with reference to the accompanying drawing, in which:

FIG. 4 presents a pair of tables illustrating how two maintenance parameters—CPD signal power level and round-trip time delay—are frequency coded, i.e., their set of values are assigned a corresponding set of center frequencies for a pilot to be injected into the communication network;

DETAILED DESCRIPTION OF THE PREFERRED EMBODIMENT

Figure 1:
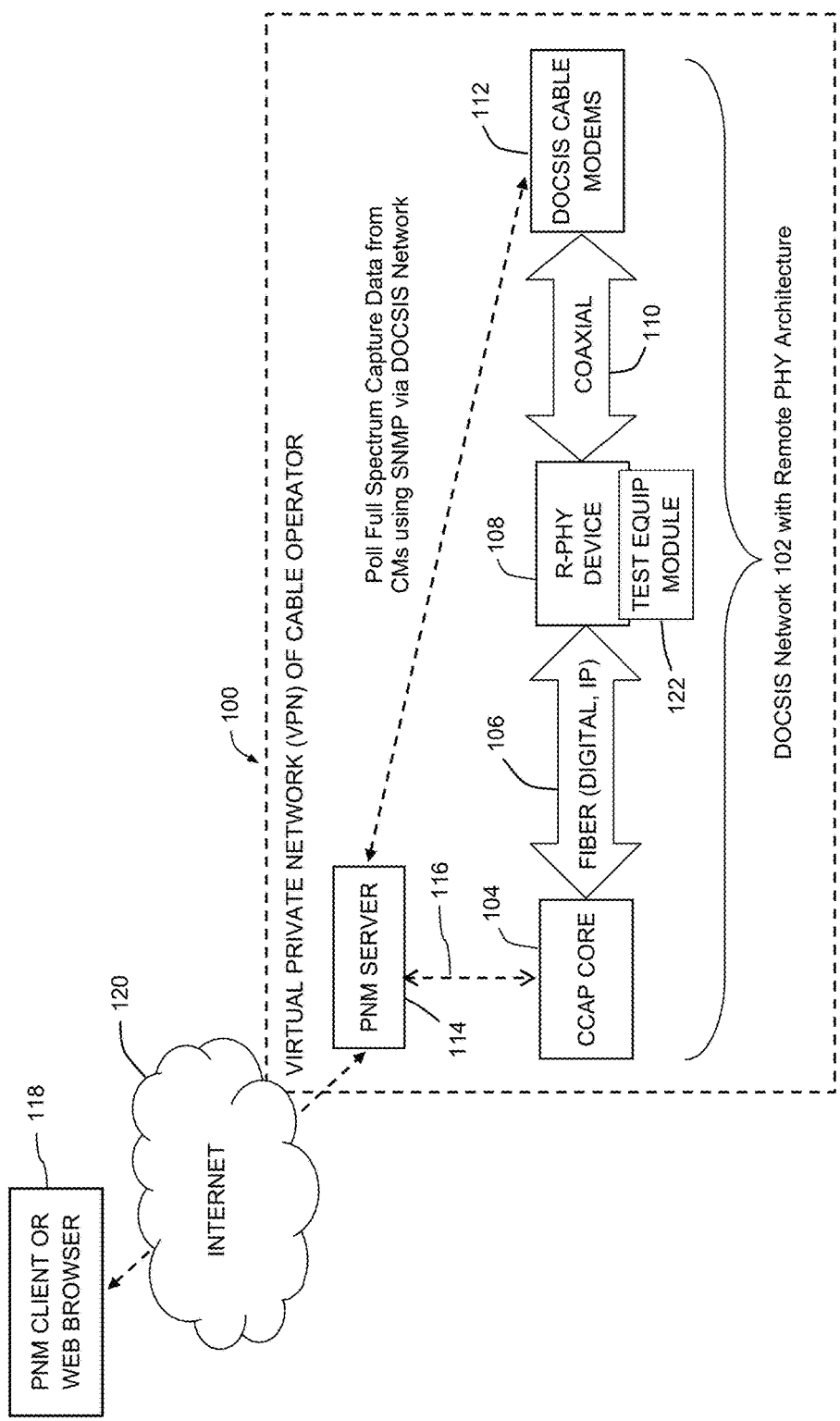
FIG. 1 is a block diagram of a cable system including an HFC network supporting a DOCSIS communication network, implemented according to CCAP and Remote PHY architectures, and incorporating a test equipment module and method of the present invention.

Referring to FIG. 1, a block diagram is shown of a cable system 100, constructed in accordance with CCAP and Remote PHY architectures and specifications discussed above in the Background. PNM (also discussed in Background) is implemented in cable system 100. Cable system 100 includes a DOCSIS 3.0 or 3.1 communication network 102 comprising a number of physical cable system components. These components include a CCAP core 104, a fiber optic cable plant 106, a Remote Physical Layer (R-PHY) device 108, a coaxial cable plant 110, and a number of DOCSIS 3.0 and/or 3.1 cable modems (CMs) 112. CCAP-core 104 contains a CMTS core for DOCSIS data communication and an Edge QAM core for video. The CMTS core (not shown) contains a DOCSIS Media Access Control unit (MAC) and upper layer DOCSIS protocols, including signaling functions, downstream and upstream bandwidth scheduling, and DOCSIS framing. The Edge QAM core (not shown) contains all video processing functions that an Edge QAM usually provides. Downstream DOCSIS, MPEG video and out-of-band (OOB) signals are transmitted from CCAP core 104 to Remote PHY device 108 via fiber cable plant 106, in the form of Ethernet or PON digital (IP) signals. Remote PHY device 108 converts these downstream signals to analog for transmission to CMs 112 via coaxial cable plant 110. CMs 112 transmit upstream DOCSIS and OOB analog signals to Remote PHY device 108 via coaxial cable plant 110. Remote PHY device 108 converts the upstream DOCSIS and OOB analog signals to digital format (Ethernet or PON) for transmission to CCAP-core 104 via fiber plant 106. Remote PHY device 108 contains circuitry (not shown), such as downstream QAM modulators, upstream QAM demodulators, and logic to connect and communicate with CCAP-core 104.

The term "downstream signals" means signals traveling in a downstream direction in DOCSIS network 102 (e.g., from CCAP core 104 to CMs 112) and located in a downstream frequency band. Similarly, the term "upstream signals" means signals traveling in an upstream direction in network 102 (e.g., from CMs 112 to CCAP core 104) and located in an upstream frequency band. In North American cable systems, the legacy downstream frequency band is from just below 54 MHz to as high as 1002 MHz or more. The DOCSIS 3.1 downstream band is 258 MHz (optional 108 MHz) to 1218 MHz (optional 1794 MHz). The legacy upstream frequency band is from 5 MHz to as high as 42 MHz. The DOCSIS 3.1 upstream band is 5-204 MHz, with support for 5-42 MHz, 5-65 MHz, 5-85 MHz and 5-117 MHz.

Figure 2:
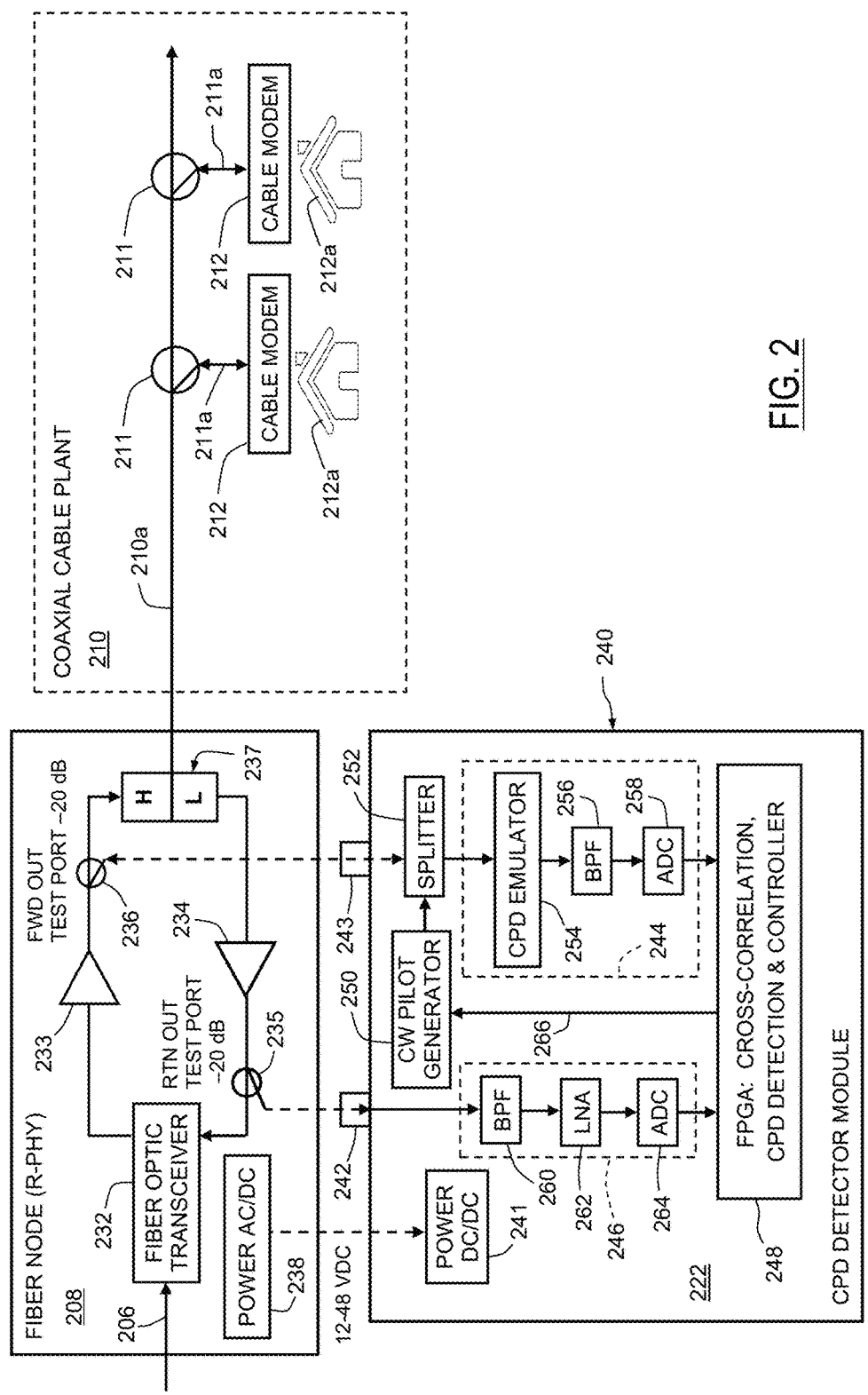
FIG. 2 is a block diagram of the test equipment module of the present invention, installed in or along side a Remote PHY fiber node device, and connected to forward and return test ports of the device for communication with the DOCSIS communication network.

Again referring to FIG. 1, CCAP core 104 may be located at a headend or in a hub of cable system 100, and Remote PHY device (RPD) 108 may be located in a hub or integrated in an optical node of cable system 100 (see, e.g., Section 5.2 of the Remote PHY Specification). CMs 112 may be located at subscribers' homes as part of customer premise equipment (CPE). As indicated, CCAP core 104, fiber plant 106, Remote PHY device 108, coaxial plant 110, and CMs 112 form DOCSIS communication network 102. In FIG. 1, Remote PHY device 108 is configured as a Remote PHY optical node (FIG. 2). Device 108 is coupled at one end to fiber plant 106 and the other end to coaxial cable plant 110. As suggested previously, device 108 is in signal communication with CMs 112 via cable plant 110. CMs 112 are coupled to cable plant 110 and equipped to receive signals in the downstream frequency band from device 108. CMs 112 are DOCSIS 3.0 and/or 3.1 compliant modems, and thus are equipped to capture all or part of the frequency spectrum of downstream signals received by the modems. This means that cable modems have a built-in spectrum analyzer function that generates a frequency spectrum representation of the downstream signals (i.e., a signal representation in the frequency domain). This feature is called "full-spectrum capture" or "full-band capture" if the full downstream spectrum is captured. If less than a full-band capture, the capture is defined by a capture bandwidth or CBW. Full and partial spectrum captures are used in Proactive Network Maintenance (PNM) systems (see discussion in Background). See also, e.g., Section 9.3 of the CableLabs® Data-Over-Cable Service Interface Specifications DOCSIS® 3.1, Physical Layer Specification, CM-SP-PHYV3.1-I10-170111 (Jan. 11, 2017), which the entire document is incorporated herein by reference (hereafter "DOCSIS 3.1 Specification"); and Section 7.2.8.1 of the "PNM Best Practices: HFC Networks (DOCSIS 3.0)" document cited in the Background.

As discussed, modern cable network systems employing DOCSIS 3.0 or 3.1 specifications typically employ a PNM system. PNM systems utilize existing CMTSs (or CMTS cores) and CMs as probes or monitors in the network to help cable operators identify impairments or obtain signal performance metrics. The above-mentioned spectrum capture feature in CMs 112 is utilized in PNM system to give the operator the ability to see the downstream spectrum at multiple points (e.g., subscribers' homes) in the plant. The PNM process is typically managed by a network maintenance manager or, more specifically, a PNM server located at a headend, network operations center, or other suitable location.

In FIG. 1, a PNM server 114 is shown within cable system 100. PNM server 114 is a network management system primarily concerned with network maintenance in accordance with DOCSIS specifications and PNM Best Practices. Its functions include monitoring, measuring, testing, trouble-shooting, identifying, locating, etc. with respect to: signals in cable system 100; network components and devices operating in system 100; and faults and impairments in system 100. With respect to the present invention, PNM server 114 is the preferred form of a network management system concerned with maintenance functions in a cable system. The present invention is not limited to the use of a specifically identified PNM server. Any suitable network management system may be used (sometimes referred to herein as a "network maintenance manager"). Again referring to FIG. 1, PNM server 114 stores and executes software routines and communicates with CCAP core 104 (CMTS core) and CMs 112, to instruct these devices to carryout maintenance functions and produce maintenance or test data. PNM server 114 also polls CCAP core 104 and CMs 112, requesting receipt of the maintenance or test data. In FIG. 1, PNM server 114 communicates directly or indirectly with CCAP core 104 (or, generally, DOCSIS network 102) via a virtual private network (or virtual local area network), a wide area network, and/or other suitable network connection 116. PNM server 114 communicates with CMs 112 via connection 116 and DOCSIS network 102, using simple network management protocol (SNMP) and by addressing the IP addresses of the modems. The IP addresses of CMs 112 are stored in a database associated with PNM server 114.

CMs 112 are instructed, from time-to-time, by server 114 to perform a spectrum capture of the downstream signals and to send the resulting data (spectrum capture data) to server 114 via DOCSIS network 102. Server 114 receives the spectrum capture data from each modem. Spectrum capture data constitutes a spectrum representation of downstream signals (see FIG. 6, #600). The operation of server 114 may be scheduled, activated, modified, or otherwise controlled by cable operator personnel through a user interface such as a "PNM client" (or Web browser) 118 and a wide area network 120 such as the Internet (and, in some cases, also via the cable operator's own virtual private network or back office network).

A test equipment module 122, constructed in accordance with the present invention, is installed inside, along side, or otherwise in association with Remote PHY device 108. In the context of such installations, device 108 is referred to as a "host network device." In FIG. 1, device 108 is a Remote PHY fiber node (FIG. 2; #208). Of course, module 122 may be installed in many different network devices, such as, for example, other Remote PHY devices, legacy fiber nodes, and RF bi-directional amplifiers. Typically, module 122 will be able to access the downstream and upstream signals of communication network 102 via test ports available in, associate with, or nearby host device 108 (FIG. 2).

FIG. 2 is a block diagram showing an installation of a test equipment module 222 in accordance with the present invention. Module 222 is operatively coupled to a Remote PHY node 208. Node 208 is coupled at its upstream end to a fiber optic cable plant 206 (see also FIG. 1) and at its downstream end to a coaxial cable plant 210. At a terminal end of cable plant 210 is a hard-line branch 210a containing a number of multi-taps 211. Extending from each multi-tap 211 is one or more coaxial drop cables 211a, which connect to home networks in subscriber (customer) premises 212a. Within premises 212a are DOCSIS 3.0/3.1 compliant cable modems 212. Modems 212 are coupled to drop cables 211a (through the home network) and thus are coupled to cable plant 210. Node 208 is coupled, via cable plant 210, to modems 212 and is in signal communication with modems 212. Fiber cable plant 206, node 208 and coaxial cable plant 210 together form part of a DOCSIS communication network (like network 102 in FIG. 1).

Device 208 is labeled as a Remote PHY node in FIG. 2, but the operative components shown in FIG. 2 are generic to either a Remote PHY node or a legacy node. "Legacy node" simply refers to a fiber optic node that is not equipped to implement the Remote PHY architecture. As discussed earlier, a Remote PHY node further includes the relocated analog transmission components such as downstream QAM modulators, upstream QAM demodulators, and logic to connect to a CCAP-core. The operative components of node 208 include a fiber optic transceiver 232, a downstream signal amplifier 233, an upstream signal amplifier 234, an upstream (return or RTN) test port 235, a downstream (forward or FWD) test port 236, an RF diplex filter 237, and an AC-to-DC power supply 238. Diplex filter 237 has a lowpass filter response defined by the upstream frequency band and a highpass filter response defined by the downstream frequency band. The recited components of node 208 are well-known; thus, a further description is not provided here. Test ports 235 and 236 provide access to the analog transmission signals received from (upstream signals) or transmitted to (downstream signals) coaxial cable plant 210. For purposes of the present invention, there should be access to analog transmission signals of the network, which may be, in a given application, just the downstream signals or both the downstream and upstream signals. Access to such signals is typically available in a host network element such as node 208; however, access to such signals may be gained by any suitable means and the present invention is not limited to access in a node or other host network element.

In FIG. 2, test equipment module 222 is shown as a common path distortion (CPD) detector, modified in accordance with the present invention. The scope of the present invention is not limited to a CPD detection function. Module 222 may be any test equipment module that performs the functions of equipment previously deployed in the headend (see Remote PHY Specification, Appendix 1.2). Module 222 could be a signal level meter for either or both of the upstream and downstream signals. Similarly, it could be a device for measuring just about any signal performance metric of the upstream and/or downstream signals (e.g., signal-to-noise ratio, carrier-to-noise ratio, modulation error rate, maximum amplitude variation across channel, etc.). Further, module 222 could be a time-domain or frequency-domain reflectometer, in which case module 222 may inject a probe signal through a test port. In this Detailed Description, a CPD detector module is chosen as an example of using both the upstream and downstream signals.

Again referring to FIG. 2, module 222 includes a housing 240 containing a pair of connectors (e.g., push connectors) 242 and 243. Upon installation, a pair of cables (dash lines) connect to connectors 242 and 243 and test ports 235 and 236 to establish full signal communication between module 222 and node 208. Inside housing 240, module 222 includes a DC-to-DC power supply 241, a downstream signal receiver 244, an upstream signal receiver 246, a measurement system 248, a CW pilot generator 250, and a signal splitter 252. Receiver 244 includes a CPD emulator 254, a bandpass filter (BPF) 256, and an analog-to-digital converter (ADC) 258. Receiver 246 includes a bandpass filter (BPF) 260, a low-noise amplifier (LNA) 262, and an analog-to-digital converter (ADC) 264. Measurement system 248 communicates with pilot generator 250 via a serial peripheral interface (SPI) bus 266. Upon installation, a power cable (dash line) connects (node) power supply 238 to (module) power supply 241. Node power supply 238 provides DC voltages from 12 to 48 volts, and module power supply 241 converts these voltages to appropriate voltages for the active components in module 222. The active components include measurement system 248, pilot generator 250, CPD emulator 254, ADC 258, LNA 262, ADC 264, and a clock (not shown). The input of receiver 244 is coupled to connector 243 through signal splitter 252, and the input of receiver 246 is coupled to connector 242. The outputs of receivers 244, 246 are connected to measurement system 248.

In receiver 244, CPD emulator 254 processes the downstream signals received through connector 243/splitter 252, as a preliminary step in the process of detecting CPD signals and locating their source in cable plant 210 (e.g., based on time delay). Emulator 254 utilizes a diode in conjunction with a pair of matched transistors to produce a non-linear response. This response produces intermodulation (IM) signals as a result of a mixing of the downstream signals in emulator 254. These IM signals emulate actual common path distortion (CPD) signals, which are also IM products of the downstream signals, generated in plant 210 by a non-linear impairment (e.g., a corroded connector or contact). BPF 256 limits the bandwidth of the IM signals produced by emulator 254 to a band defined relative to the upstream frequency band or a portion of the upstream band. This limited band is called the "detection band." In the FIG. 2 embodiment, the actual distortion signals (CPD signals) of interest are those produced in the upstream frequency band. Theses signals travel upstream in plant 210 and are received by receiver 246 via return test port 235. As an example, the detection band may be 12 MHz wide, from about 6 MHz to about 18 MHz. In another embodiment, the detection band may be the entire upstream frequency band (e.g., 5 to 42 MHz). In the latter case, BPF 256 may be replaced with a lowpass filter. In any event, the limited band of IM signals (emulated CPD) from filter 256 is then converted from analog to digital form in ADC 258. The digital output of ADC 258 is then received in measurement system 248. In some applications, CPD emulator 254 may be implemented in measurement system 248, as executable instructions, routines, and/or programmable logic. The latter implementation would result in a more simplified or generic receiver.

Again referring to FIG. 2, upstream receiver 246 receives the upstream signals of cable plant 210 from return test port 235, via connector 242. BPF 260 defines the detection band for CPD detection. BPF 260 limits the receiver bandwidth relative to the entire upstream frequency band. If the detection band is to be the entire upstream frequency band, then BPF 260 may be reconfigured or eliminated. In FIG. 2, the band-limited upstream frequencies are then amplified in LNA 262. The amplified, band-limited upstream frequencies are then converted from analog to digital form by ADC 264. The digital output of ADC 264 is then received in measurement system 248. Measurement system 248 now has the two inputs (one from receiver 244 and one from receiver 246) it needs to perform CPD detection and source location. The operation of ADCs 258 and 264 are synchronized by a common clock (not shown), and the sampling interval of both ADCs are made long enough to capture the actual distortion signals (CPD signals) created by the specific downstream signals received in receiver 244.

Figure 3:
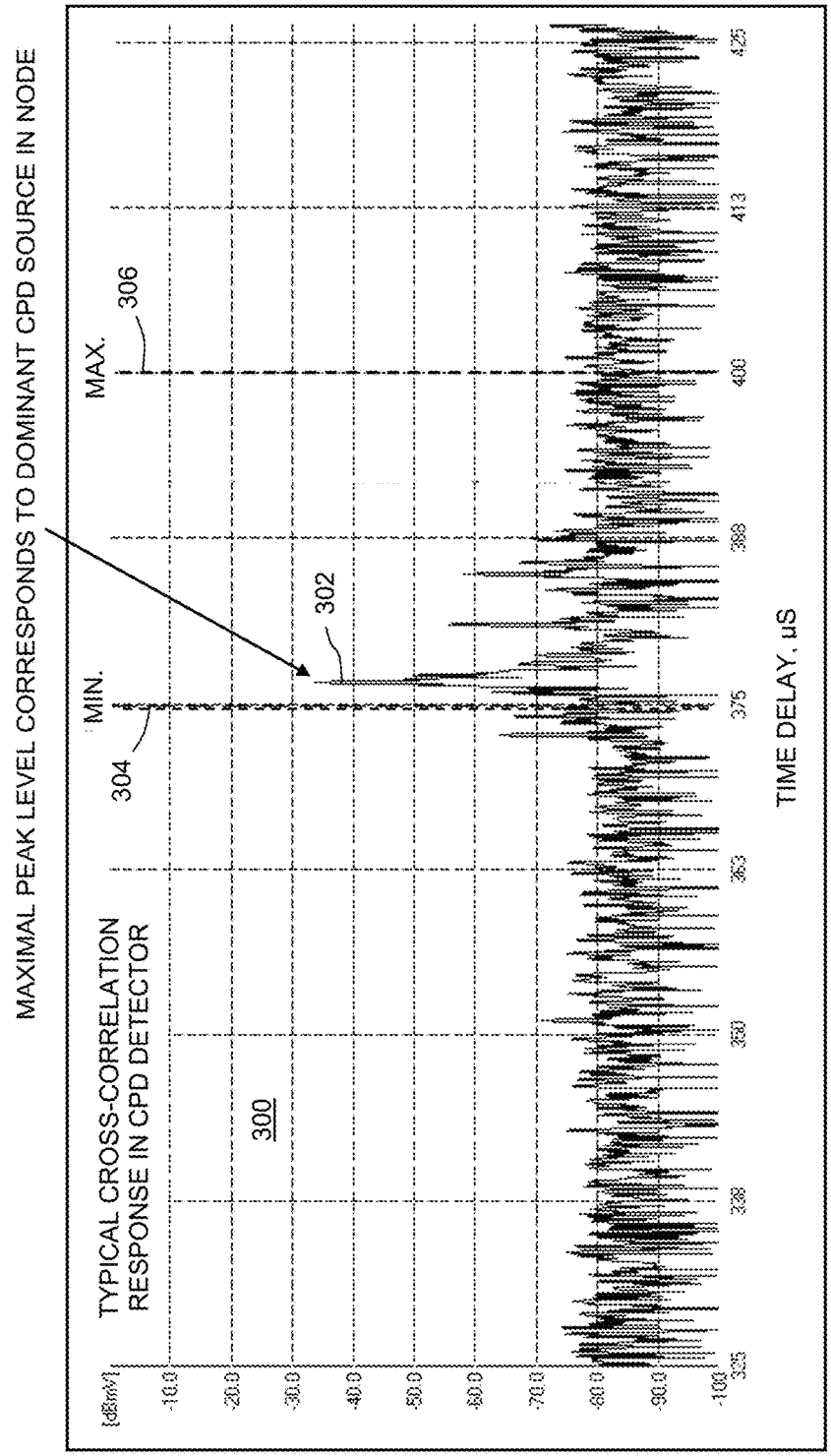
FIG. 3 is a typical cross-correlation response produced by one embodiment of the test equipment module of the present invention, showing a maximal correlation peak corresponding to a dominant CPD source in the HFC network.

Measurement system 248 is a signal processor and controller that performs a cross-correlation of the two inputs from receivers 244 and 246. The cross-correlation is performed to detect the presence of actual CPD signals in the upstream frequency band (i.e., within the detection band). The cross-correlation produces a cross-correlation response that is a function of CPD signal power versus time delay (or time difference between downstream signals received in receiver 244 and actual CPD signals received in receiver 246). FIG. 3 shows a typical cross-correlation response 300 with a maximal peak 302 located within an interval defined between a Min. point 304 and a Max. point 306. Min. point 304 represents 0 time delay and Max. point 306 represents an estimated maximum round-trip time delay for coaxial cable plant 210. Peak 302 represents CPD signal power within the detection band (or upstream band) and corresponds to a dominant CPD source in plant 210. System 248 measures a value of the CPD signal power level from the maximal peak in the cross-correlation response (e.g., about −34 dBmV in FIG. 3) and a value for the time delay associated with the peak (e.g., about 2.3 µsec. from Min. point 304 in FIG. 3). The time delay is the round-trip propagation time between node 208 and the CPD source (unknown location) in plant 210. The location of the CPD source is determined from the time delay and the velocity of propagation in the coaxial cable in plant 210. The level of the CPD signal power and the time delay associated with the CPD signals are referred to herein as "maintenance parameters." Measurement system 248 determines the values of these maintenance parameters.

System 248 is preferably implemented in a field-programmable gate array chip, such as a Xilinx® FPGA XC3S400A-4FTG256C, manufactured Xilinx, Inc., San Jose, Calif. System 248 may also be implemented as a System on a Chip (SoC) or a hybrid SoC/FPGA chip, such as the Altera® SoC, manufactured by Intel Corporation, Santa Clara, Calif. In some applications, an application specific integrated circuit (ASIC) chip or traditional programmable microprocessor may be used to implement system 248.

The heretofore described CPD detection and location process, as characterized by cross-correlation and as implemented by receivers 244, 246 and measurement system 248, is known in the industry. Such a process and means for carrying it out are described in further detail in U.S. Pat. No. 7,415,367 to Williams, U.S. Pat. No. 7,584,496 to Zinevich, and U.S. Patent Application Publication 20160119662 to Zinevich, all of which are incorporated herein by reference.

Back to FIG. 2. After measurement system 248 determines a value of one or both of the maintenance parameters—CPD level and/or time delay—system 248 and pilot generator 250 "encode" this information on a continuous wave (CW) pilot signal or signals generated by pilot generator 250. System 248 is programmed with a code, algorithm, cross-reference table or other relationship between a range of values of the maintenance parameter and a corresponding range of center frequencies for the pilot signal ("frequency code"). Specifically, system 248 determines, for example, a value of the CPD signal power level from a cross-correlation response and, based on a frequency code, determines or identifies a corresponding center frequency to be assigned to the pilot signal. System 248 then generates a frequency number or tuning voltage corresponding to the center frequency. The frequency number or tuning voltage is then delivered to pilot generator 250 via SPI bus 266. Pilot generator 250 is a tunable CW signal synthesizer with an integrated voltage controlled oscillator (VCO), such as an Analog Devices ADF4351 chipset, manufactured by Analog Devices, Inc., Norwood, Mass. Generator 250 has the ability to generate two pilot signals simultaneously. Generator 250 interprets the frequency number (or responds to the tuning voltage) and, as a result, the VCO adjusts (tunes) its frequency accordingly, such that the frequency of the pilot signal matches the frequency corresponding to the CPD power level value. Thus, it can be said that the pilot signal is frequency encoded with the value of the CPD power level. Similarly, a pilot signal is frequency encoded with a value of the time delay. If both maintenance parameters are to be encoded, pilot generator generates either two simultaneous pilots at different frequencies (see FIG. 5) or one pilot signal at different time intervals (e.g., one second—one pilot; next second—second pilot).

In FIG. 4, Table I and Table II present examples of how the two aforementioned maintenance parameters are coded. In Table I, a number of CPD signal power level values (in 10 dB steps) are assigned to a corresponding number of center frequencies (in 20 kHz steps) for the pilot signal. For example, a 0 dBmV power level is assigned a pilot frequency of 89.19 MHz and a −70 dBmV power level is assigned a pilot frequency of 89.05 MHz. The frequency range (89.05 to 89.19 MHz) for this code is 140 kHz wide (also called a "CPD level sub-band") and is within an unoccupied segment of the downstream frequency band (i.e., 88 to 90 MHz). Note further from Table I that a frequency of 89.00 MHz is assigned for the situation when the CPD power level is indeterminable (by system 248)— shown as <−70 dBmV. The latter frequency is referred to as the "default frequency" (assigned for the indeterminate case). In Table II, a number of round-trip time delay values (in 0.1 µsec steps) are assigned to a corresponding number of frequencies (in 600 Hz steps) for the pilot signal. For example, a 0 time delay (Min. point 304 in FIG. 3) is assigned to a frequency of 88.9506 MHz and a 25 µsec time delay (Max. point 306 in FIG. 3) is assigned to a frequency of 88.8000 MHz. The time delay of correlation peak 302 (FIG. 3) is 2.3 µsec, which is assigned to a frequency of 88.9350 MHz. The frequency range (88.8000 to 88.9500 MHz) for this code is 150 kHz wide (also called a "time delay sub-band") and is within the unoccupied segment (88 to 90 MHz) of the downstream band. Thus, useful ranges of values of both maintenance parameters can be easily represented in a 400 kHz pilot band (±200 kHz—illustrated in FIG. 5).

Figure 5:
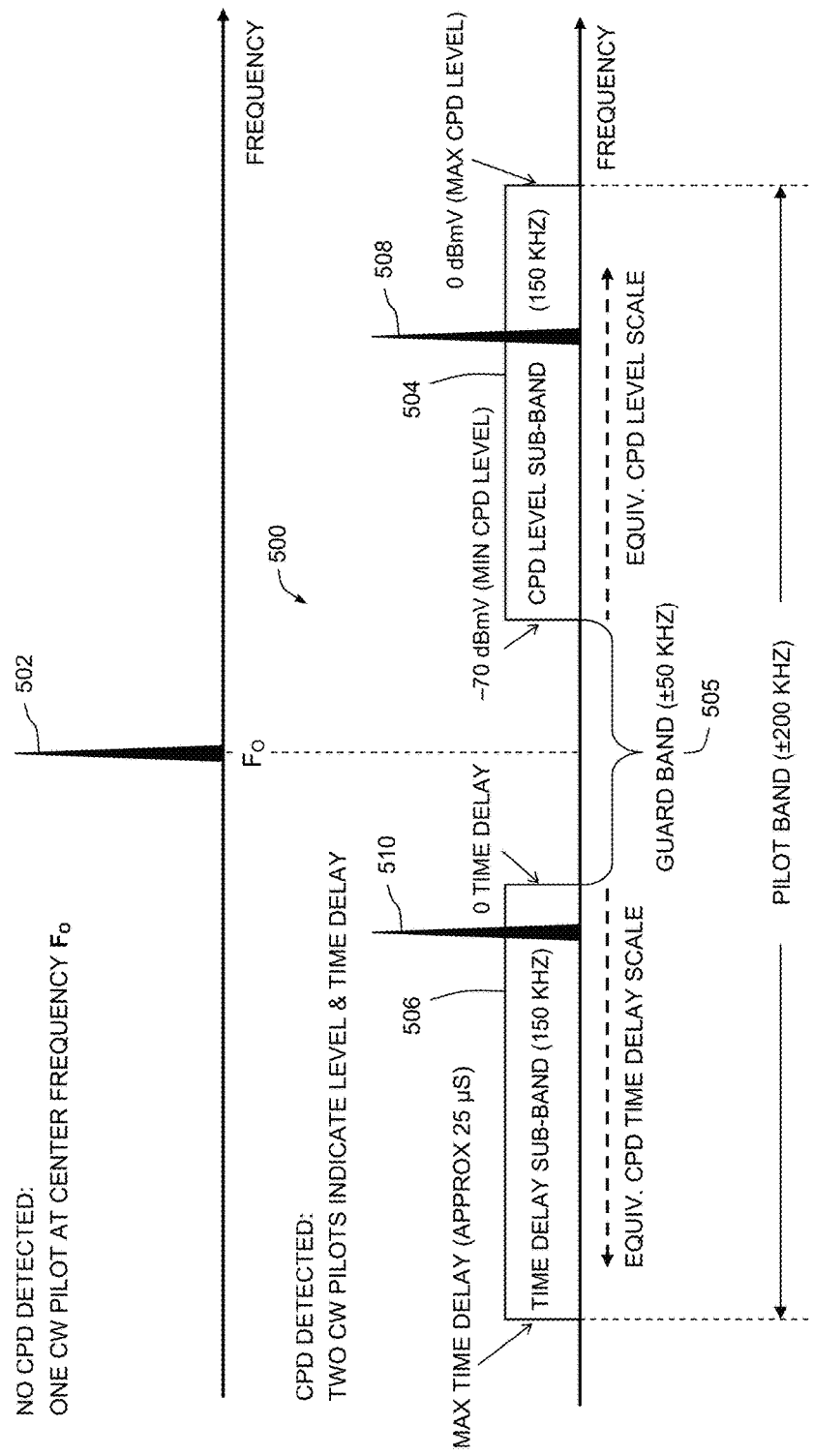
FIG. 5 is a frequency spectrum diagram showing allocation of pilots in a pilot band within in the downstream frequency band of the communication network, and showing pilot placement in two pilot sub-bands to support coding of two maintenance parameters—CPD level and time delay.

FIG. 5 illustrates a pilot band 500 and examples of pilot placement within the pilot band. FIG. 5 shows upper and lower frequency plots. The upper plot illustrates pilot placement when no CPD signal is detected or when a CPD signal power level is indeterminable (thus, triggering a decision that no CPD signal is detected). In the upper plot, a pilot signal 502 is placed at a frequency $F_0$, which is at the center of pilot band 500. In the FIG. 4 example, $F_0$ is 89 MHz (the center of unoccupied downstream segment, 88-90 MHz). The lower plot illustrates pilot placement when CPD signals are detected. As an example, pilot band 500 is 400 kHz (±200 kHz) wide and centered at $F_0$. Band 500 includes a 150 kHz sub-band 504, a 100 kHz guard band 505, and a 150 kHz sub-band 506. Sub-band 504 represents the frequency allocation for pilot frequencies corresponding to CPD signal power levels, ranging from 0 dBmV to −70 dBmV (in 10 dB steps—FIG. 4, Table I). Sub-band 506 represents the frequency allocation for pilot frequencies corresponding to round-trip time delays, ranging from 0 to 25 μsec (in 0.1 μsec steps—FIG. 4, Table II). A first CW pilot signal 508 is inserted in sub-band 504 and a second CW pilot signal 510 is inserted in sub-band 506. Pilot signal 508 has a center frequency of 89.14 MHz and represents a CPD signal power level of about −25 dBmV. Pilot signal 510 has a center frequency of 88.9338 MHz and represents a round-trip time delay of about 2.5 μsec. Pilot signals 508 and 510 may be generated and transmitted simultaneous or at different times (one-second intervals). Pilot band 500 can be placed in any unoccupied segment of the downstream frequency band.

In the embodiment of FIG. 2, a "signal encoder" is constituted by the cooperative operation of system 248 and pilot generator 250: (1) the operation of system 248 in utilizing pre-programmed frequency codes to convert maintenance parameter values (e.g., CPD level and time delay) to corresponding frequencies and then communicating these frequencies (e.g., in the form of a frequency number or VCO tuning voltage) to pilot generator 250; and (2) the operation of pilot generator 250 in tuning pilot signals to appropriate coded frequencies in response to, e.g., the frequency number or tuning voltage.

Again, refer to FIG. 2. Once pilot generator 250 generates a prescribed pilot signal, the signal ("encoded pilot") is transmitted through splitter 252, to downstream connector 243, and (via jumper cable) into forward test port 236. The encoded pilot is then injected and added to the downstream signals traveling through Remote PHY node 208. The encoded pilot then travels with the downstream signals through coaxial cable plant 210 to cable modems 212. In the example given, the encoded pilot is located in the FM band (i.e., 88 to 90 MHz), which is at the lower end of the downstream frequency band. Forward test port 236 has about −40 dB of isolation between the tap and the output. Thus, if the encoded pilot has a signal level of +45 dBmV at the tap input of test port 236, then the level of the pilot at the output of node 208 will be about +5 dBmV. The signal levels of the downstream signals (e.g., QAM signals) are about +45 to +50 dBmV at the output of node 208. Thus, the level of the encoded pilot at the output of node 208 is about −40 dBc (dB below carrier) relative to the regular downstream signals. This relative level (−40 dBc) is also the approximate relative level at modems 212.

Each modem 212 receives the downstream signals along with the encoded pilot or pilots. At the request of the network maintenance manager or PNM server 114 (FIG. 1), each modem 212 produces a frequency spectrum representation of all or part of the downstream signals (e.g., each performs a spectrum capture of said signals). To be sure, the spectrum of the encoded pilot(s) is likewise captured. In one embodiment, PNM server 114 may request a spectrum capture of only a relatively narrow band of the downstream signals ("capture bandwidth"), such as 20 MHz (e.g., the FM band) centered around the pilot band. The capture bandwidth may even be narrower, such as the unoccupied band (e.g., 88 to 90 MHz) or only the pilot band itself (band 500 in FIG. 5). The dynamic range of the spectrum capture function in modems 212 is greater than 50 dB. Thus, the encoded pilot(s) will easily be detected and measured (i.e., pilot is only 40 dB down from regular downstream signal level: −40 dBc).

Figure 6:
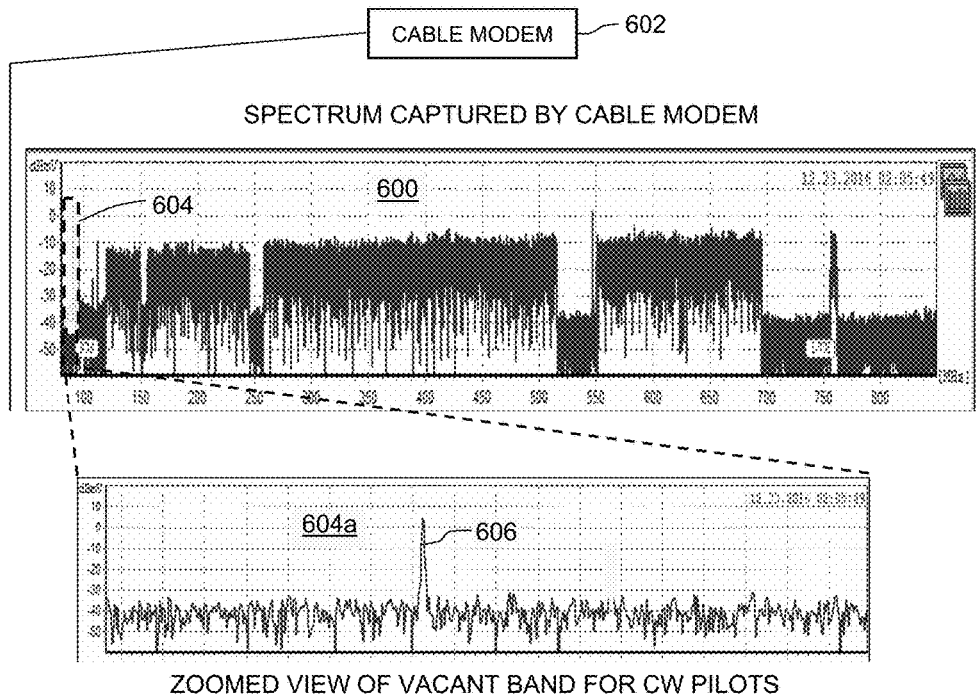
FIG. 6 is a diagram illustrating a spectrum capture function of a cable modem, including a full-spectrum capture of the downstream signals (full downstream spectrum) and a zoomed-in view of a vacant band in the downstream spectrum, which is allocated for the pilot band.
Figure 7:
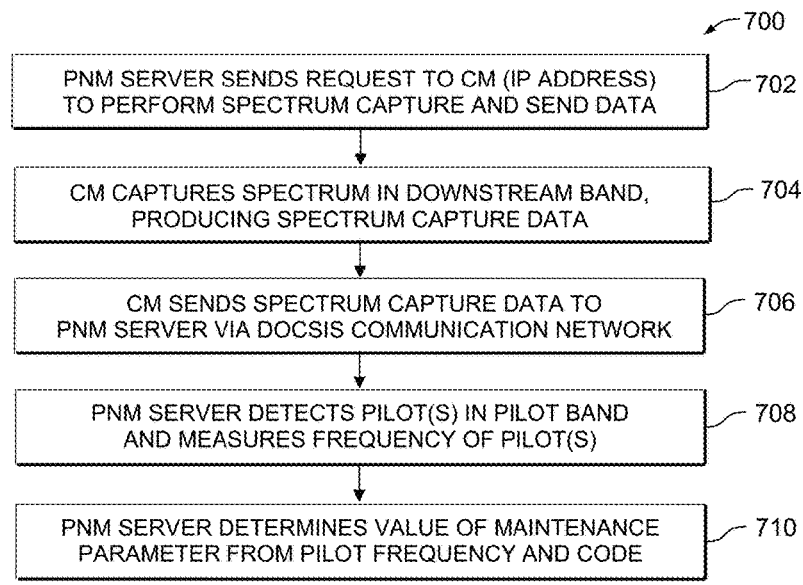
FIG. 7 is a flow diagram of the process of a PNM server requesting a spectrum capture at a cable modem and receipt of resulting spectrum capture data, PNM server's detection of a pilot from spectrum capture data and measurement of pilot frequency, and PNM server's determination of a maintenance parameter value from the pilot frequency, based on a code.

FIG. 6 shows a downstream signal spectrum 600 captured by a cable modem 602. In the illustrated example, spectrum 600 extends from about 84 MHz to about 850 MHz. Within spectrum 600, there is a normally unoccupied frequency band 604 within the public FM band. Band 604 is shown in a zoomed-in view as a spectrum 604a. Spectrum 604a extends from 88 MHz to 90 MHz, as in the previous example (FIGS. 4 & 5). A CW pilot 606 is shown within spectrum 604a, indicating that module 222 has measured a maintenance parameter (e.g., CPD power level or time delay) and injected pilot 606 into the downstream band (to represent a value of the maintenance parameter). FIG. 7 shows a flow diagram outlining a process 700 carried out by the network maintenance manager or PNM server. In a first step 702, the PNM server addresses one or more cable modems in a node (e.g., by IP address) and requests that each modem perform a spectrum capture of all or a portion of the downstream signals and to send the resulting spectrum data to the PNM server. Of course, any requested capture of downstream spectrum should include the pilot band. In a step 704, each addressed modem performs the requested spectrum capture and produces a set of spectrum capture data. In a step 706, each modem sends its set of spectrum capture data to the PNM server via the cable system's communication network (e.g., DOCSIS communication network 102 in FIG. 1). In a step 708, the PNM server receives spectrum capture data from each modem and attempts to detect pilot signals from the data. If a pilot signal or signals are detected, the PNM server then measures the center frequency or frequencies of the pilot or pilots. In a final step 710, the PNM server determines the maintenance parameter value from the center frequency of each pilot and from the frequency code (originally used in module 222 to encode the pilot or pilots).

An advantage of the above-described frequency coding is that the maintenance parameter value (e.g., CPD signal level or round-trip time delay) encoded on the pilot is not a function of the amplitude of the encoded pilot (as received by the cable modem). Thus, variations in amplitude of the encoded pilot (e.g., due to different insertion losses at different points in the coaxial plant) will not adversely affect the accuracy of reading the correct maintenance parameter value.

Figure 8:
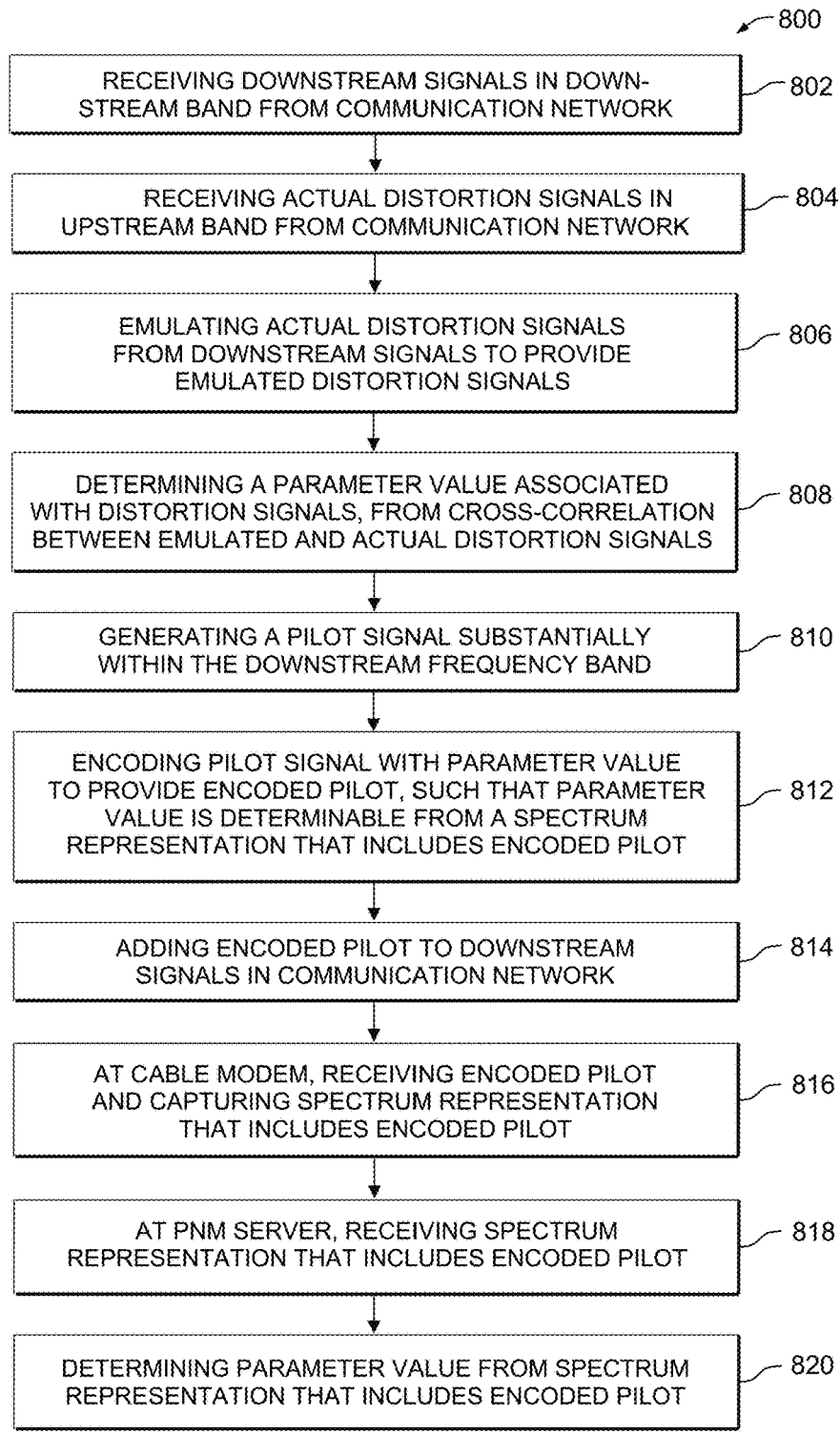
FIG. 8 is a flow diagram of a method of communicating CPD-related maintenance parameter values in a cable system, in accordance with one embodiment of the present invention.

FIG. 8 is a flow diagram outlining a method 800 of communicating maintenance data in a cable system, according to the illustrated embodiment of the present invention. Method 800 is performed in cable system 100 (FIG. 1), which includes communication network 102. Network 102 carries downstream signals in a downstream frequency band and upstream signals in an upstream frequency band. In a step 802, the downstream signals are received from network 102 at a test location, during a sampling interval. In a step 804, actual distortion signals (e.g., CPD) in the upstream frequency band are received from network 102 at the test location, during the same sampling interval. In a step 806, the actual distortion signals are locally emulated from the downstream signals received in step 802, to provide emulated distortion signals. In a step 808, a parameter value associated with the actual distortion signals (e.g., CPD level or time delay) is determined from a cross-correlation between the emulated and actual distortion signals. In a step 810, a pilot signal (pilot) is generated substantially within the downstream frequency band. In a step 812, the pilot is encoded with the parameter value, to provide an encoded pilot, such that the value is determinable from a spectrum representation that includes the encoded pilot. In a step 814, the encoded pilot is added to the downstream signals in network 102. In a step 816, the encoded pilot is received at cable modem(s) 212 and a spectrum representation that includes the encoded pilot is captured by the modems. In a step 818, the spectrum representation that includes the encoded pilot is received by PNM server 114. Lastly, in a step 820, the parameter value is determined from the spectrum representation that includes the encoded pilot. Step 820 is carried out by measuring the frequency of the encoded pilot and decoding it, e.g., converting it to the appropriate parameter value or pointing to the appropriate value from a look-up table or the like. If the parameter value is the round-trip time delay between the test location and the non-linear impairment causing the actual distortion signals, then an estimate of the location of the non-linear impairment is determined from the time delay and a velocity of propagation in coaxial cable plant 210. The step of estimating the location may be performed as part of a software application running on PNM server 114 and/or on a PNM client or Web-browser.

The time delay parameter is not only helpful in estimating the location of the CPD source, it is also useful in confirming that a dominant CPD source has been removed (problem fixed) during maintenance work. A time delay value identifies a particular CPD source and distinguishes it from other (usually less dominant) sources. See, for example, FIG. 3, where dominant CPD peak 302 is shown along with two lower CPD peaks (right of peak 302). Sometimes, the lower peaks merely represent reflections of the dominant CPD source signals (e.g., reflections off passive devices further downstream); thus, after removing the dominant CPD source the lower peaks will disappear in many cases.

As indicated earlier, the present invention is not limited to test equipment modules that detect CPD or a method of communicating only CPD data to a PNM server. Receiver 244 and/or receiver 246 (FIG. 2) may be specifically designed or configured for a particular parameter to be measured or tested. For example, if system 248 was configured to measure a particular upstream signal parameter, then receiver 246 may be designed a little differently than as shown in FIG. 2. In FIG. 2, receiver 244 includes a CPD emulator 254 to process downstream signals for the detection of CPD signals. A CPD emulator may not be necessary in modules intended for other maintenance parameters. Also, depending on the measurements or tests to be performed, the module of the present invention may only contain receiver 244 (not receiver 246). For example, if measurement system 248 is configured to perform a test or measurement directly on downstream signals, then receiver 246 may be unnecessary. However, if module 222 is to measure CPD or other non-linear distortion signals, upstream receiver 246 becomes useful. In an alternative arrangement, a single receiver may be employed for both upstream and downstream signals, where an input to the single receiver is switched between test ports 235 and 236.

Referring back to FIG. 2, node 208 may be configured as a multi-port device, passing downstream signals to multiple coaxial cable branches and receiving upstream signals (including non-linear distortion signals) from the multiple branches. In such a device, there is a diplex filter 237 for each branch and a return test port 235 for accessing upstream signals of each branch. A typical multi-port device is a 4-port fiber optic node having four diplex filters 237 connected to four coaxial cable branches and containing four return test ports 235. The present invention can be adapted for such a device by connecting a return path switch between the four return test ports 235 and connector 242 of module 222. Thus, in such case, receiver 246 of module 222 will process the upstream signals of each branch in series. A return path switch is disclosed in U.S. Pat. No. 7,584,496 to Zinevich (see FIG. 1; #3), which is incorporated herein by reference. In measuring for CPD signals, module 222 simply repeats (for each branch) the process described previously for detecting CPD signals from a single coaxial cable input. In the 4-port case, the CPD results (level and/or time delay) for a particular branch is coded on a pilot signal, which is allocated to a pilot sub-band of frequencies unique for that branch. Thus, to distinguish the results of four branches, there should be four pilot sub-bands. Another approach is to allocate a pilot sub-band for coding the branches and another pilot sub-band for coding the CPD values (level or time delay). For example, in a first sub-band, a pilot may assume one of four frequencies to identify one of four branches, and in a second sub-band, a pilot may assume one of eight frequencies to identify a CPD level (in 10 dB steps—see Table I in FIG. 4). In a variation of the latter approach, a 2-bit binary code is used in the first sub-band to identify four branches, using zero, one or two pilots (e.g., [00], [01], [10], [11]).

An object of the present invention is to provide a test equipment module that has low manufacturing cost and low power consumption. An aspect of the present invention that allows this object to be achieved is the elimination of a communication device in the module. Instead, a pilot generator is employed and, by its injection of an encoded pilot into the communication network, maintenance parameter data can be communicated to a PNM server through the existing cable plant. The power consumption of the pilot generator is about 0.2 watts and the generator costs about $6.00 (much less than a DOCSIS cable modem). The total power consumption of the module of the present invention (e.g., module 222) is about 1.5 watts. Cost and power savings can also be achieved in applications where there are more than one maintenance parameter to be communicated. In this latter case, such savings can be achieved by generating two pilots at different moments in time (e.g., one second—one pilot and next second—second pilot) instead of simultaneously. Thus, an even simpler, lower-cost, lower power-consuming, pilot generator can be used. In the latter, case, the PNM server will be able to detect both pilots by requesting data at multiple times and from different cable modems.

The various functions of the present invention, as described above, may be implemented in hardware, firmware, software, or a combination of these. For example, with respect to hardware, these functions may be implemented in an application specific integrated circuit (ASIC), digital signal processor (DSP), field programmable gate array (FPGA), micro-controller, microprocessor, programmable logic device, general purpose computer, special purpose computer, other electronic device, or a combination of these devices (hereinafter "processor"). If the various functions are implemented in firmware, software, or other computer-executable instructions, then they may be stored on any suitable computer-readable media. Computer-executable instructions may cause a processor or other device to perform the aforementioned functions of the present invention. Computer-executable instructions include data structures, objects, programs, routines, or other program modules accessible and executable by a processor. The computer-readable media may be any available media accessable by a processor. Embodiments of the present invention may include one or more computer-readable media. Generally, computer-readable media include, but are not limited to, random-access memory ("RAM), read-only memory ("ROM), programmable read-only memory ("PROM), erasable programmable read-only memory ("EPROM), electrically erasable programmable read-only memory ("EEPROM"), compact disk read-only memory ("CD-ROM), or any other device or component that is capable of providing data or executable instructions accessible by a processor. Certain embodiments recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. A test equipment module for use in a cable system of the type that includes
    (i) a communication network carrying downstream signals in a downstream frequency band and having
        a coaxial cable plant,
        a cable modem, coupled to the coaxial cable plant and equipped to receive signals in the downstream frequency band and generate a spectrum representation of the signals, and
        a host network device, coupled to the coaxial cable plant and in signal communication with the cable modem, containing a first test port that provides access to the downstream signals of the communication network, and
    (ii) a network maintenance manager, in communication with the cable modem through the communication network, for receiving the spectrum representation of the signals from the cable modem, said test equipment module comprising:
    a first receiver, coupleable to the first test port of the host network device, for receiving the downstream signals of the communication network;
    a measurement system, coupled to said first receiver, for determining a value of a first maintenance parameter associated with at least one of the downstream signals;
    a pilot generator, coupled to said measurement system, for generating a first pilot signal substantially within the downstream frequency band; and
    signal encoder, associated with said measurement system and said pilot generator, for encoding the first pilot signal with the value of the first maintenance parameter to provide a first encoded pilot, such that the value of the first maintenance parameter is determinable from a spectrum representation that includes the first encoded pilot,
    said pilot generator coupleable to the first test port of the host network device for adding the first encoded pilot to the downstream signals in the communication network, such that the cable modem receives the first encoded pilot and generates a spectrum representation that includes the first encoded pilot and the network maintenance manager receives the spectrum representation that includes the first encoded pilot,
    whereby the network maintenance manager is able to determine the value of the first maintenance parameter from the spectrum representation that includes the first encoded pilot.

2. The test equipment module of claim 1, wherein said signal encoder operates based on a coding relationship between a plurality of coding frequencies for the first pilot signal and a plurality of values for the first maintenance parameter, respectively, and wherein the encoding of the first pilot signal with the value of the first maintenance parameter includes
    tuning the first pilot signal to a frequency of the plurality of coding frequencies that substantially corresponds to the value of the first maintenance parameter determined by said measurement system, such that the value of the first maintenance parameter is determinable from the frequency of the first pilot signal.

3. The test equipment module of claim 2, wherein the coding relationship includes a relationship between a default frequency for the first pilot signal and a decision that a value for the first maintenance parameter is indeterminable by said maintenance system, and wherein said signal encoder tunes the first pilot signal to the default frequency upon a decision that a value for the first maintenance parameter is indeterminable.

4. The test equipment module of claim 3, wherein the plurality of frequencies and the default frequency of the coding relationship are situated within a 200 kHz wide, unoccupied portion of the downstream frequency band.

5. The test equipment module of claim 2, wherein the plurality of frequencies of the coding relationship are situated in an unoccupied portion of the downstream frequency band.

6. The test equipment module of claim 2, wherein the plurality of frequencies of the coding relationship are situated within a 200 kHz wide, unoccupied portion of the downstream frequency band.

7. The test equipment module of claim 1, wherein the first pilot signal generated by said pilot generator is a continuous wave (CW) signal.

8. The test equipment module of claim 1, wherein the host network device is a legacy fiber node.

9. The test equipment module of claim 1, wherein the host network device is a remote physical layer (R-PHY) fiber node.

10. The test equipment module of claim 1, wherein the host network device is a remote physical layer (R-PHY) device.

11. The test equipment module of claim 1, wherein the host network device is a bi-directional amplifier.

12. The test equipment module of claim 1 and the host network device being housed in a common enclosure.

13. The test equipment module of claim 1, further comprising a second receiver coupled to said measurement system,
    the communication network carrying upstream signals in an upstream frequency band and the host network device containing a second test port that provides access to the upstream signals, the upstream signals including at least one actual distortion signal created from the downstream signals by a non-linear impairment in the coaxial cable plant, said second receiver being coupleable to the second test port of the host network device for receiving from the communication network the at least one actual distortion signal, said first receiver including a distortion emulator for emulating the at least one actual distortion signal from the received downstream signals to provide at least one emulated distortion signal, said measurement system receiving the at least one emulated distortion signal from the first receiver and the at least one actual distortion signal from the second receiver, the first maintenance parameter being a level of the at least one actual distortion signal, said measurement system being configured to determine a value of the level of the at least one actual distortion signal from a cross-correlation between the at least one emulated distortion signal and the at least one actual distortion signal.

14. The test equipment module of claim 13, wherein said second receiver includes a band limiting filter for defining a receive frequency band over which the at least one actual distortion signal is received.

15. The test equipment module of claim 14, wherein the receive frequency band of said second receiver is about 12 MHz wide.

16. The test equipment module of claim 14, wherein the receive frequency band of said second receiver is about 6 MHz to about 18 MHz.

17. The test equipment module of claim 1, wherein:
said measurement system is configured to determine a value of a second maintenance parameter associated with at least one of the downstream signals;
said pilot generator is configured to generate a second pilot signal substantially within the downstream frequency band;
said signal encoder is configured to encode the second pilot signal with the value of the second maintenance parameter to provide a second encoded pilot, such that the value of the second maintenance parameter is determinable from a spectrum representation that includes the second encoded pilot; and
said pilot generator adds the second encoded pilot to the downstream signals in the communication network when said pilot generator is coupled to the first test port of the host network device, such that the cable modem receives the second encoded pilot and generates a spectrum representation that includes the second encoded pilot, and the network maintenance manager receives the spectrum representation that includes the second encoded pilot,
whereby the network maintenance manager is able to determine the value of the second maintenance parameter from the spectrum representation that includes the second encoded pilot.

18. The test equipment module of claim 17, further comprising a second receiver coupled to said measurement system,
the communication network carrying upstream signals in an upstream frequency band and the host network device containing a second test port that provides access to the upstream signals, the upstream signals including at least one actual distortion signal created from the downstream signals by a non-linear impairment in the coaxial cable plant, said second receiver being coupleable to the second test port of the host network device for receiving from the communication network the at least one actual distortion signal, said first receiver including a distortion emulator for emulating the at least one actual distortion signal from the received downstream signals to provide at least one emulated distortion signal, said measurement system receiving the at least one emulated distortion signal from the first receiver and the at least one actual distortion signal from the second receiver, the first maintenance parameter being a level of the at least one actual distortion signal, the second maintenance parameter being a round-trip time delay between the host network device and the non-linear impairment, as determined by the time difference between the at least one actual and the at least one emulated distortion signals, said measurement system being configured to determine, (i) a value of the level of the at least one actual distortion signal and (ii) a value of the round-trip time delay between the host network device and the non-linear impairment, from a cross-correlation between the at least one emulated distortion signal and the at least one actual distortion signal.

19. The test equipment module of claim 1, further comprising a second receiver coupled to said measurement system,
the communication network carrying upstream signals in an upstream frequency band and the host network device containing a second test port that provides access to the upstream signals, the upstream signals including actual distortion signals created from the downstream signals by a non-linear impairment in the coaxial cable plant,
said second receiver being coupleable to the second test port of the host network device for receiving from the communication network the actual distortion signals,
said first receiver including a distortion emulator for emulating the actual distortion signals from the received downstream signals, to provide emulated distortion signals,
said measurement system receiving the emulated distortion signals from the first receiver and the actual distortion signals from the second receiver,
the first maintenance parameter being a level of the actual distortion signals,
said measurement system being configured to determine a value of the level of the actual distortion signals from a cross-correlation between the emulated distortion signals and the actual distortion signals.

20. The test equipment module of claim 19, wherein the non-linear impairment is a source of common path distortion (CPD), and the actual distortion signals are CPD distortion signals.

21. A method of communicating network maintenance data in a cable system of the type that includes
(i) a communication network carrying downstream signals in a downstream frequency band and having
a coaxial cable plant,
a cable modem, coupled to the coaxial cable plant and equipped to receive signals in the downstream frequency band and generate a spectrum representation of the signals, and
a host network device, coupled to the coaxial cable plant and in signal communication with the cable modem, containing a first test port that provides access to the downstream signals of the communication network, and (ii) a network maintenance manager, in communication with the cable modem through the communication network, for receiving the spectrum representation of the signals from the cable modem, said method comprising the steps of:

(a) receiving the downstream signals of the communication network through the first test port of the host network device;

(b) determining a value of a first maintenance parameter associated with at least one of the downstream signals;

(c) generating a first pilot signal substantially within the downstream frequency band;

(d) encoding the first pilot signal with the value of the first maintenance parameter to provide a first encoded pilot, such that the value of the first maintenance parameter is determinable from a spectrum representation that includes the first encoded pilot; and (e) adding the first encoded pilot to the downstream signals in the communication network, such that the cable modem receives the first encoded pilot and generates a spectrum representation that includes the first encoded pilot and the network maintenance manager receives the spectrum representation that includes the first encoded pilot, whereby the network maintenance manager is able to determine the value of the first maintenance parameter from the spectrum representation that includes the first encoded pilot.

22. The method of claim 21, wherein the encoding in step (d) is based on a coding relationship between a plurality of coding frequencies for the first pilot signal and a plurality of values for the first maintenance parameter, respectively, and wherein step (d) includes tuning the first pilot signal to a frequency of the plurality of coding frequencies that substantially corresponds to the value of the first maintenance parameter determined in step (b), such that the value of the first maintenance parameter is determinable from the frequency of the first pilot signal.

23. The method of claim 22, wherein the coding relationship includes a relationship between a default frequency for the first pilot signal and a decision that a value of the first maintenance parameter is indeterminable in step (b), and wherein step (d) includes tuning the first pilot signal to the default frequency upon a decision that the value of the first maintenance parameter is indeterminable in step (b).

24. The method of claim 21, wherein the communication network carries upstream signals in an upstream frequency band and the host network device contains a second test port providing access to the upstream signals, the upstream signals including at least one actual distortion signal created from the downstream signals by a non-linear impairment in the coaxial cable plant, said method further comprising the step of (f) receiving from the communication network, though the second test port of the host network device, the at least one actual distortion signal, and wherein:

the first maintenance parameter is the level of the at least one actual distortion signal;

step (a) includes emulating the at least one actual distortion signal from the downstream signals to provide at least one emulated distortion signal; and step (b) includes determining a value of the level of the at least one actual distortion signal from a cross-correlation between the at least one emulated distortion signal and the at least one actual distortion signal.

25. The method of claim 21, wherein the communication network carries upstream signals in an upstream frequency band and the host network device contains a second test port providing access to the upstream signals, the upstream signals including actual distortion signals created from the downstream signals by a non-linear impairment in the coaxial cable plant, said method further comprising the step of (f) receiving from the communication network, though the second test port of the host network device, the actual distortion signals, and wherein:

the first maintenance parameter is the level of the actual distortion signals;

step (a) includes emulating the actual distortion signals from the downstream signals to provide at least one emulated distortion signal; and step (b) includes determining a value of the level of the actual distortion signals from a cross-correlation between the emulated distortion signals and the actual distortion signals.

26. The method of claim 21, further comprising the steps of:

(f) determining a value of a second maintenance parameter associated with at least one of the downstream signals;

(g) generating a second pilot signal substantially within the downstream frequency band;

(h) encoding the second pilot signal with the value of the second maintenance parameter to provide a second encoded pilot, such that the value of the second maintenance parameter is determinable from a spectrum representation that includes the second encoded pilot; and (i) adding the second encoded pilot to the downstream signals in the communication network, such that the cable modem receives the second encoded pilot and generates a spectrum representation that includes the second encoded pilot and the network maintenance manager receives the spectrum representation that includes the second encoded pilot, whereby the network maintenance manager is able to determine the value of the second maintenance parameter from the spectrum representation that includes the second encoded pilot.

27. The method of claim 26, wherein the communication network carries upstream signals in an upstream frequency band and the host network device contains a second test port providing access to the upstream signals, the upstream signals including at least one actual distortion signal created from the downstream signals by a non-linear impairment in the coaxial cable plant, said method further comprising the step of (j) receiving from the communication network, though the second test port of the host network device, the at least one actual distortion signal, and wherein:

step (a) includes emulating the at least one actual distortion signal from the downstream signals to provide at least one emulated distortion signal;

the first maintenance parameter is a level of the at least one actual distortion signal;

the second maintenance parameter is a round-trip time delay between the host network device and the non-linear impairment in the communication network, as determined by a time difference between the at least one actual and the at least one emulated distortion signals;

step (b) includes determining a value of the level of the at least one actual distortion signal from a cross-correlation between the at least one emulated distortion signal and the at least one actual distortion signal; and step (f) includes determining a value of the round-trip time delay between the host network device and the non-linear impairment, from the cross-correlation of step (b).

28. A method of communicating network maintenance data in a cable system of the type that includes a communication network carrying downstream signals in a downstream frequency band and having a coaxial cable plant and a cable modem coupled to the coaxial cable plant, the cable modem being equipped to receive signals in the downstream frequency band and generate a spectrum representation of the signals, and a network maintenance manager in communication with the cable modem through the communication network, said method comprising the steps of:

(a) receiving the downstream signals from the communication network;

(b) determining a value of a first maintenance parameter associated with at least one of the downstream signals;

(c) generating a first pilot signal substantially within the downstream frequency band;

(d) encoding the first pilot signal with the value of the first maintenance parameter to provide a first encoded pilot, such that the value of the first maintenance parameter is determinable from a spectrum representation that includes the first encoded pilot;

(e) adding the first encoded pilot to the downstream signals in the communication network;

(f) at the cable modem, receiving the first encoded pilot and capturing a spectrum representation that includes the first encoded pilot;

(g) at the network maintenance manager, receiving the spectrum representation that includes the first encoded pilot; and (h) determining the value of the first maintenance parameter from the spectrum representation that includes the first encoded pilot.

29. The method of claim 28, wherein the encoding function in step (d) is based on a coding relationship between a plurality of coding frequencies for the first pilot signal and a plurality of values for the first maintenance parameter, respectively, and wherein step (d) includes tuning the first pilot signal to a frequency of the plurality of coding frequencies that substantially corresponds to the value of the first maintenance parameter determined in step (b), such that the value of the first maintenance parameter is determinable from the frequency of the first pilot signal.

30. The method of claim 29, wherein the coding relationship includes a relationship between a default frequency for the first pilot signal and a decision that a value of the first maintenance parameter is indeterminable in step (b), and wherein step (d) includes tuning the first pilot signal to the default frequency upon a decision that the value of the first maintenance parameter is indeterminable in step (b).

31. The method of claim 28, wherein the communication network carries upstream signals in an upstream frequency band, the upstream signals including at least one actual distortion signal created from the downstream signals by a non-linear impairment in the coaxial cable plant of the communication network, said method further comprising the step of (i) receiving the at least one actual distortion signal from the communication network, and wherein:

the first maintenance parameter is the level of the at least one actual distortion signal;

step (a) includes emulating the at least one actual distortion signal from the downstream signals to provide at least one emulated distortion signal; and step (b) includes determining a value of the level of the at least one actual distortion signal from a cross-correlation between the at least one emulated distortion signal and the at least one actual distortion signal.

32. The method of claim 28, wherein the communication network carries upstream signals in an upstream frequency band, the upstream signals including actual distortion signals created from the downstream signals by a non-linear impairment in the coaxial cable plant of the communication network, said method further comprising the step of (i) receiving the actual distortion signals from the communication network, and wherein:

the first maintenance parameter is the level of the actual distortion signals;

step (a) includes emulating the actual distortion signals from the downstream signals to provide emulated distortion signals; and step (b) includes determining a value of the level of the actual distortion signals from a cross-correlation between the emulated distortion signals and the actual distortion signals.

33. The method of claim 32, wherein the encoding function in step (d) is based on a coding relationship between a plurality of coding frequencies for the first pilot signal and a plurality of values for the level of the actual distortion signals, respectively, and wherein step (d) includes tuning the first pilot signal to a frequency of the plurality of coding frequencies that substantially corresponds to the value of the level of the actual distortion signals determined in step (b), such that the value of the level of the actual distortion signals is determinable from the frequency of the first pilot signal.

34. The method of claim 33, wherein the coding relationship includes a relationship between a default frequency for the first pilot signal and a decision that a value for the level of the actual distortion signals is indeterminable in step (b), and wherein step (d) includes tuning the first pilot signal to the default frequency upon a decision that the value of the level of the actual distortion signals is indeterminable in step (b).

35. The method of claim 28, further comprising the steps of:

(i) determining a value of a second maintenance parameter associated with at least one of the downstream signals;

(j) generating a second pilot signal substantially within the downstream frequency band;

(k) encoding the second pilot signal with the value of the second maintenance parameter to provide a second encoded pilot, such that the value of the second maintenance parameter is determinable from a spectrum representation that includes the second encoded pilot;

(l) adding the second encoded pilot to the downstream signals in the communication network;

(m) at the cable modem, receiving the second encoded pilot and capturing a spectrum representation that includes the second encoded pilot;

(n) at the network maintenance manager, receiving the spectrum representation that includes the second encoded pilot; and (o) determining the value of the second maintenance parameter from the spectrum representation that includes the second encoded pilot.

36. The method of claim 35, wherein the communication network carries upstream signals in an upstream frequency band, the upstream signals including at least one actual distortion signal created from the downstream signals by a non-linear impairment in the coaxial cable plant of the communication network, said method further comprising the step of (p) receiving the at least one actual distortion signal from the communication network, and wherein:

step (a) includes emulating the at least one actual distortion signal from the downstream signals to provide at least one emulated distortion signal;

the first maintenance parameter is a level of the at least one actual distortion signal;

the second maintenance parameter is a time difference between the at least one actual and the at least one emulated distortion signals;

step (b) includes determining a value of the level of the at least one actual distortion signal from a cross-correlation between the at least one emulated distortion signal and the at least one actual distortion signal; and step (i) includes determining a value of the time difference between the at least one actual and the at least one emulated distortion signals, from the cross-correlation of step (b).

37. A method of communicating network maintenance data in a cable system that includes a communication network having a coaxial cable plant and a cable modem coupled to the coaxial cable plant, the coaxial cable plant carrying downstream signals in a downstream frequency band and upstream signals in an upstream frequency band, the cable modem being equipped to receive signals in the downstream frequency band and generate a spectrum representation of the signals, and a network maintenance manager in communication with the cable modem through the communication network, said method comprising the steps of:

(a) receiving the upstream signals carried by the coaxial cable plant of the communication network;

(b) determining a value of a maintenance parameter associated with at least one of the upstream signals;

(c) generating a pilot signal substantially within the downstream frequency band;

(d) encoding the pilot signal with the value of the maintenance parameter to provide an encoded pilot, such that the value of the maintenance parameter is determinable from a spectrum representation that includes the encoded pilot;

(e) adding the encoded pilot to the downstream signals in the communication network;

(f) at the cable modem, receiving the encoded pilot and capturing a spectrum representation that includes the encoded pilot;

(g) at the network maintenance manager, receiving the spectrum representation that includes the encoded pilot; and (h) determining the value of the maintenance parameter from the spectrum representation that includes the encoded pilot.

38. The method of claim 37, wherein the encoding function in step (d) is based on a coding relationship between a plurality of coding frequencies for the pilot signal and a plurality of values for the maintenance parameter, respectively, and wherein step (d) includes tuning the pilot signal to a frequency of the plurality of coding frequencies that substantially corresponds to the value of the maintenance parameter determined in step (b), such that the value of the maintenance parameter is determinable from the frequency of the pilot signal.

* * * * *